Figure 1:
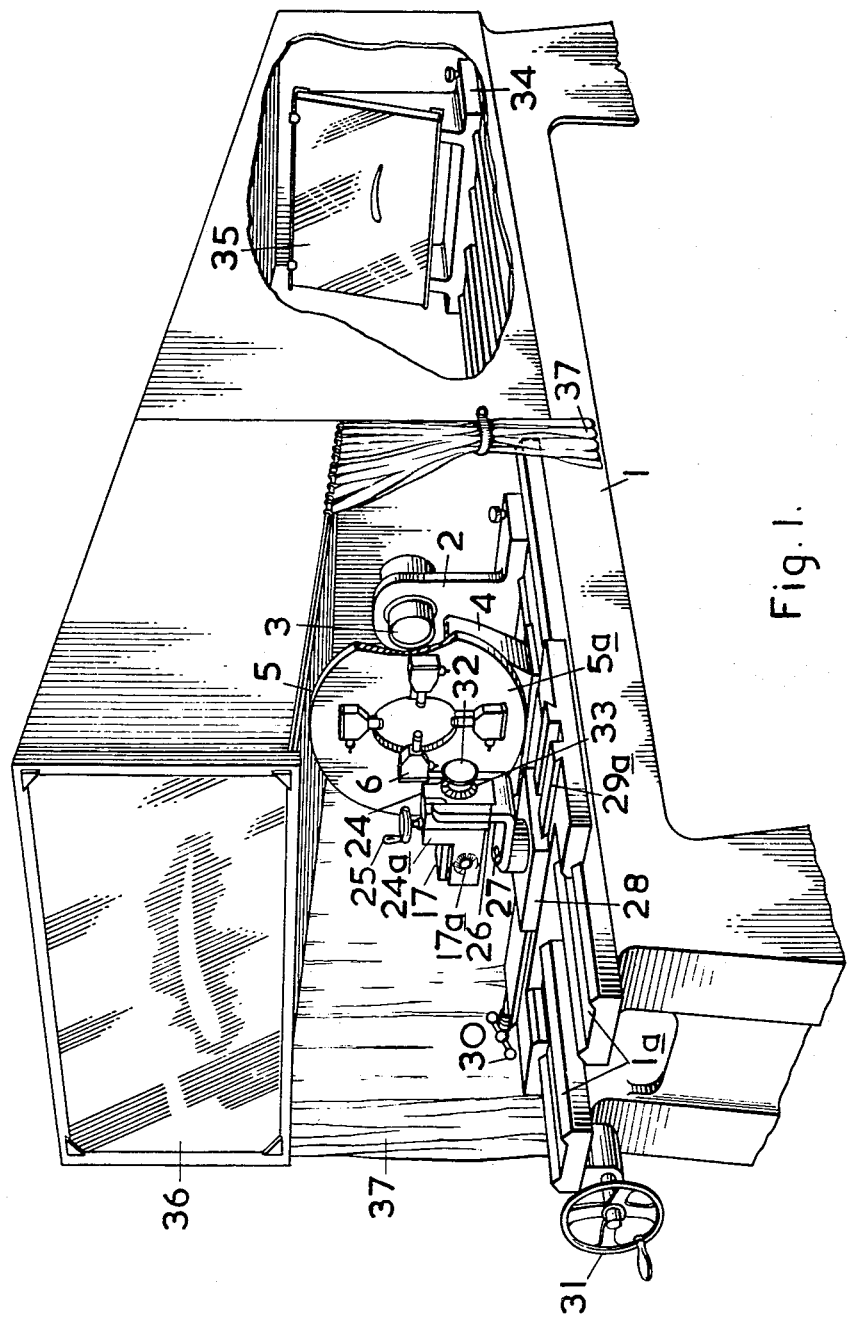
Figure 2:
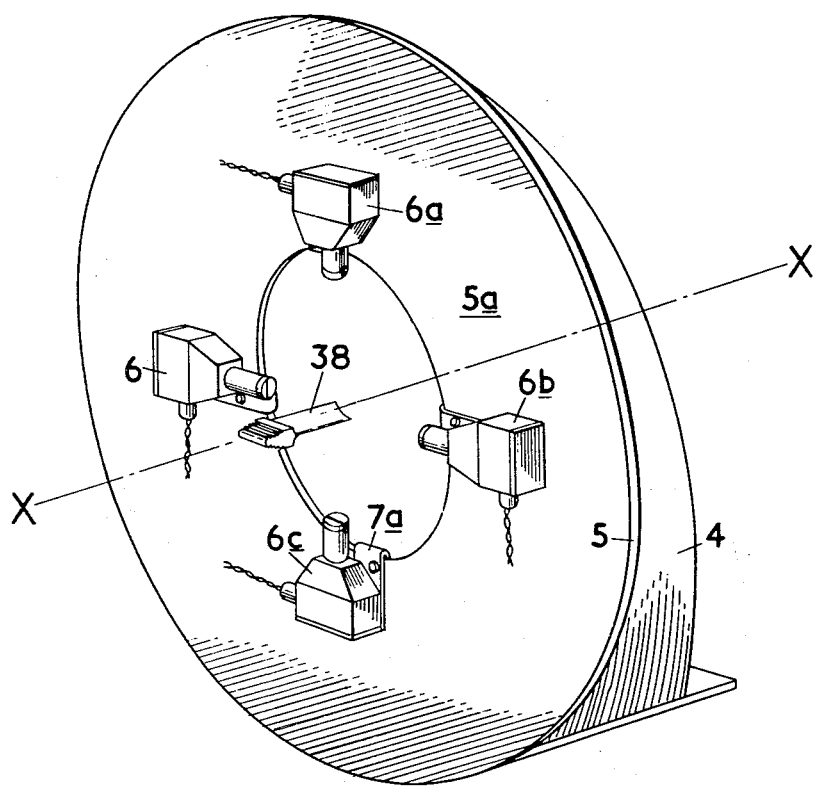
Figure 3:
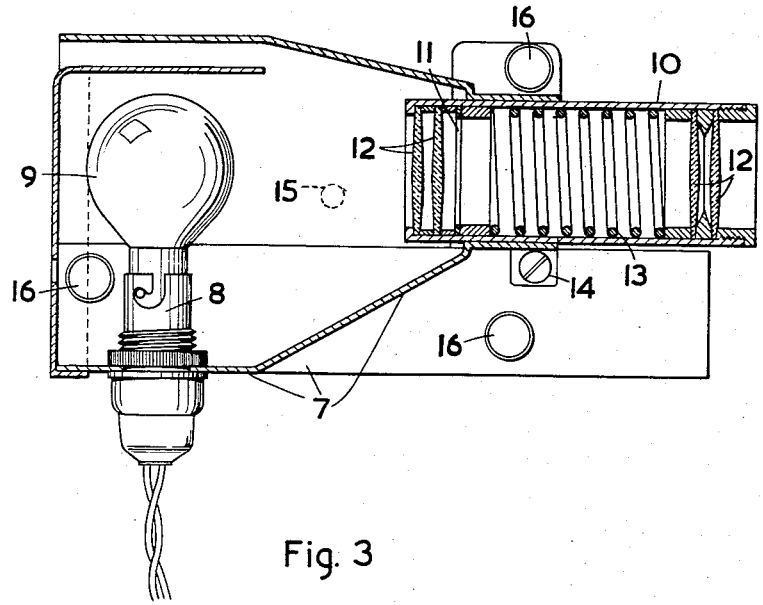
Figure 4:
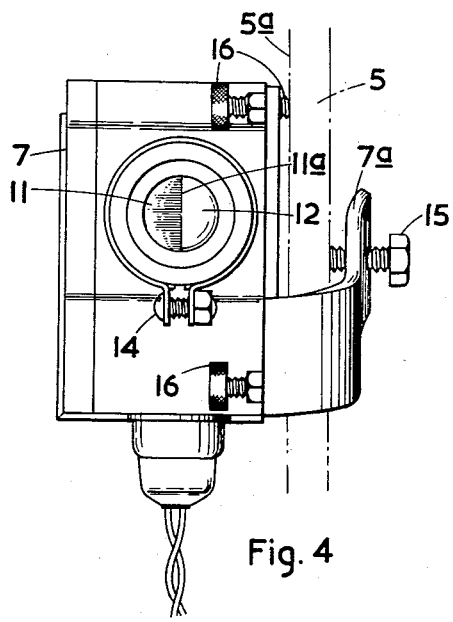

May 29, 1956 R. H. BIGGS 2,747,463
OPTICAL INSPECTION DEVICE
Filed Dec. 6, 1951 6 Sheets-Sheet 1

Inventor
Raymond Henry Biggs
By
Stevens, Davis, Miller + Mosher
Attorneys

May 29, 1956    R. H. BIGGS    2,747,463
OPTICAL INSPECTION DEVICE
Filed Dec. 6, 1951    6 Sheets-Sheet 3

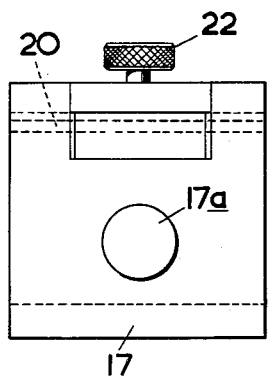
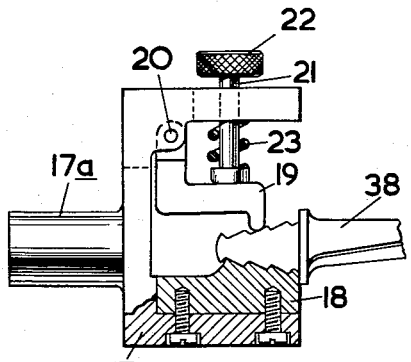
Fig. 5.  Fig. 6.
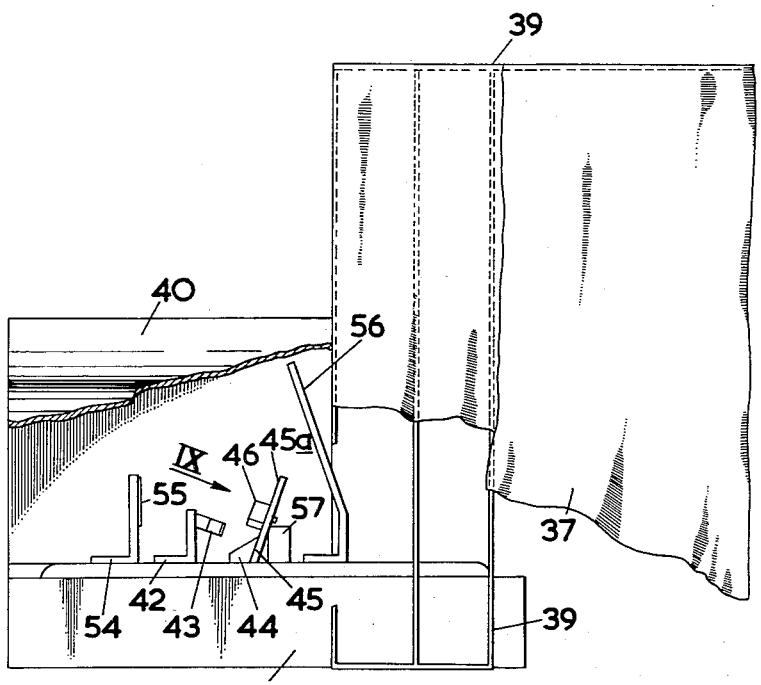
Fig. 7.

May 29, 1956        R. H. BIGGS        2,747,463
OPTICAL INSPECTION DEVICE

Filed Dec. 6, 1951        6 Sheets-Sheet 5

Inventor
Raymond Henry Biggs
By
Stevens, Davis, Miller & Mosher
his Attorneys

May 29, 1956 R. H. BIGGS 2,747,463
OPTICAL INSPECTION DEVICE
Filed Dec. 6, 1951 6 Sheets-Sheet 6

United States Patent Office 2,747,463
Patented May 29, 1956

2,747,463

OPTICAL INSPECTION DEVICE

Raymond Henry Biggs, Forest End, Sandhurst, England, assignor to Power Jets (Research and Development) Limited, London, England, a British company Application December 6, 1951, Serial No. 260,250

Claims priority, application Great Britain December 18, 1950

4 Claims. (Cl. 88—24)

It is often desirable to inspect the profile of an object so as to be able, in effect, to see the outline of its cross-section at any number of positions along its length without cutting or otherwise damaging the object. Such visual inspection is particularly desirable for turbine and similar blades but may well be useful for other objects. Purely optical methods for this purpose have the advantage of eliminating mechanical errors, they also avoid damaging the object by physical contact and so make it possible to inspect comparatively delicate objects such as wax patterns.

If a tapered object be illuminated around its profile and up to a plane behind its smaller end, which end is left in shadow in front of that plane, with a sharply defined cut-off between light and shadow, the object can be viewed from its smaller end so that its cross-section on that plane or a part of the cross-section appears as a dark shadow against a light surround. Similarly, if the illuminated and dark zones be interchanged the cross-section will appear light against surrounding shadow. The two zones could both be illuminated but with light of two different intensities or colours so that the cross-section appears in one colour surrounded by another colour, neither of which colours is black. In any case the cross-section is in silhouette against a different surrounding background.

The present invention consists in the method of inspecting an object as set forth in the last paragraph, and also in apparatus for illuminating and inspecting an object in this way.

Thus the invention is concerned with an optical inspection device having a viewing screen and optical means for projecting on to the screen a silhouette having the profile of at least part of a chosen cross-section of an elongated object under inspection. The invention consists firstly in the provision of illuminating means disposed beside the object for illuminating part of its length differently from the rest, up to a determined boundary plane, with a sharply defined cut-off in that plane between the two different kinds of illumination, a holder for the object movable to carry the object through said plane until the chosen cross-section lies in that plane, and means for projecting on to the viewing screen the view looking along the object from one end. Preferably the apparatus projects an enlarged image on the screen; the apparatus then includes a lens so located in relation to the illuminating arrangement that the sharp boundary between the illuminated zone and the non-illuminated or differently illuminated zone lies in such a plane in front of the focal plane of the lens that there is an image in focus on the screen. The object can then be tilted to a limited extent without the end nearer to the lens masking the view of the cross-section, since the lens, depending on its aperture, can pick up rays that are not cut off by the end of the object. Thus the use of the lens also allows of the inspection of objects of various shapes such as non-tapered objects, objects that are twisted along their length, or objects with a small enlargement at each end such as a turbine blade with a small shroud element at its tip. Certain objects, however, such as a short turbine blade with a large base at the root end and a large shroud at the tip could only have their whole section projected by special optical arrangements; part of the section may however be inspected by tilting the blade as hereinafter set forth.

The blade or other object can be placed on a work table or in a work holder by which it can be moved lengthwise progressively through the said boundary plane in front of the focal plane of the lens for inspection of the profile of the object at different sections along its length. It is a feature of the invention that the table or holder can be moved to tilt the blade or other object through a small angle—preferably both horizontally and vertically thus enabling blades having excessive twist or a shrouded tip to be viewed, one side at a time. If the amount of tilt is small, e. g. up to 5°, the accuracy of the device is not seriously affected for thin sections. It can be useful however to examine thicker sections or to use a greater angle of tilt and so inspect one half of an object at a time on an inclined plane which gives a section considerably different from a section on a normal plane, if the silhouette be compared with the correct section on such inclined plane.

According to a further feature of the invention the illuminating devices, each consisting of a lamp, lamp-holder, mask or slide and one or more lenses as necessary, are slidably mounted on a face for movement parallel to the said plane and held in place by means affording ready adjustment of position, e. g. spring clip, clamp, or magnetic attraction.

Figure 8:
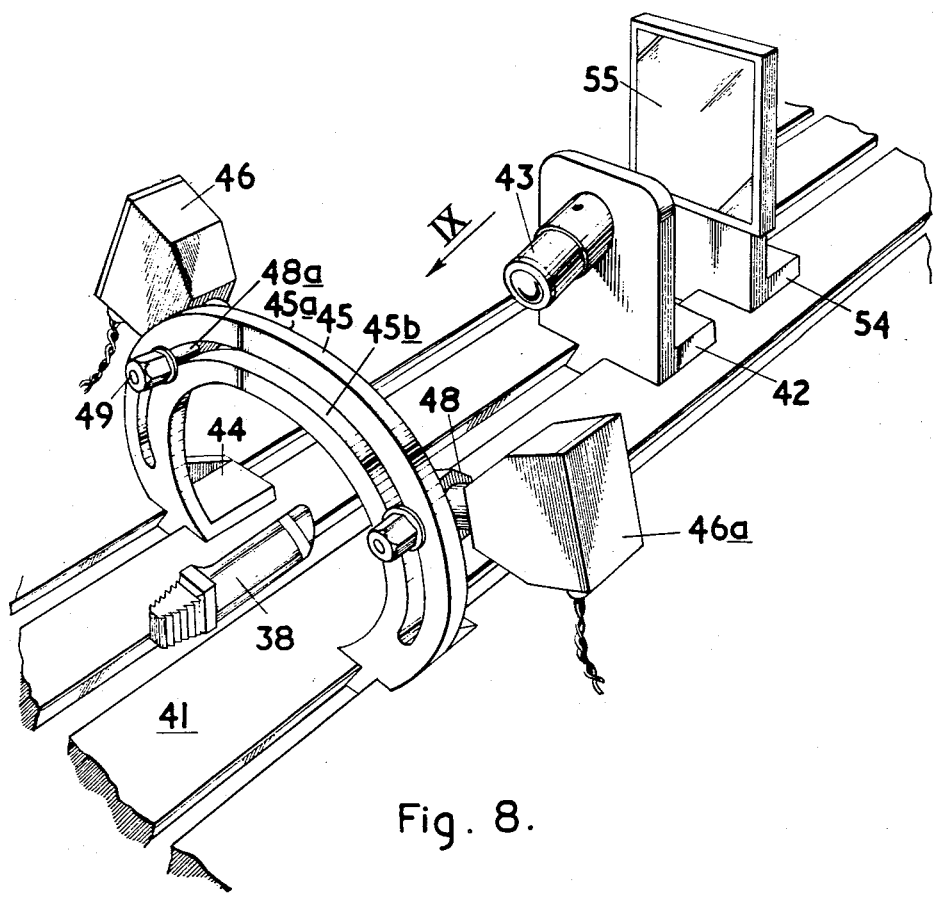
Figure 9:
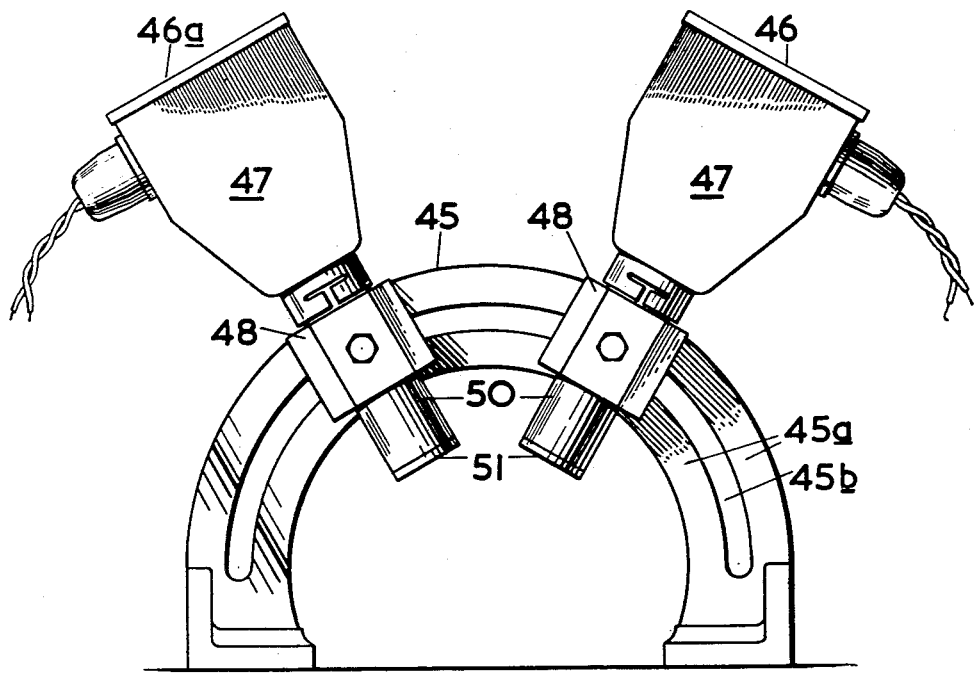
Figure 10:
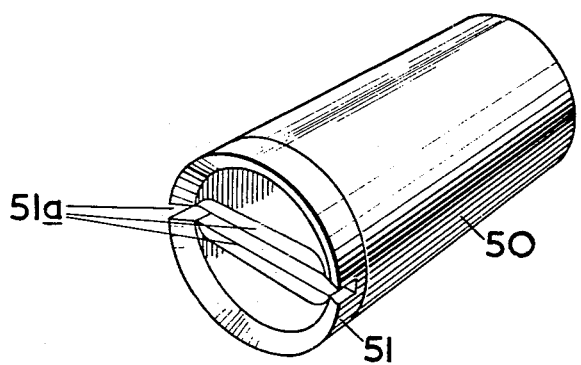

Two forms of construction, each incorporating all the essential features of the invention, are shewn in the accompanying drawings of which Fig. 1 shews the general arrangement of a general purpose inspection device, Figs. 2 to 6 are details thereof, Fig. 7 shews the general arrangement of a compact bench model suitable for inspection of the leading edges of turbine blades and Figs. 8 to 10 are details of this bench model.

In the particular form of construction shown in Figs. 1 to 6 the apparatus is mounted on a table 1. A holder 2 standing up from the table 1 carries the lens element 3 which may be a compound lens. In front of the lens element 3, supported by a bracket 4 from the table 1, is a flat metal ring plate 5 presenting a plane surface 5a which is accurately normal to the optical axis of the lens element 3. Several illuminating devices preferably four, 6 to 6c as shown—are slidably mounted on surface 5a. The plate and complete illuminating assembly is shown to a larger scale in Fig. 2, wherein the centre line X—X represents the said optical axis; the illuminating device 6 is shown in more detail in section on a plane parallel to surface 5a in Fig. 3 and in elevation viewed from the axis X—X of Fig. 2 in Fig. 4. Each device consists of a case 7 containing a lamp-holder 8, an ordinary electric lamp 9, and the optical unit consisting of tube 10 containing a sharply delineated mask 11, the arrangement of lenses 12 and the spring 13. The mask has a sharp edge 11a (Fig. 4) which, when the case 7 is in place on the plate 5, is parallel to and accurately positioned relatively to the face 5a so that the light projected is cut off sharply in a boundary plane precisely located relatively to the lens element 3; thus a zone extending from this plane towards lens element 3 is more brightly illuminated than that to the other side of the plane. The optical system of each illuminating device 6 to 6c gives a considerable depth of focus, so that the sharply defined cut-off is still obtained on a surface illuminated by the device when the distance from the device to the surface is varied. This allows the devices 6 to 6c to be moved about on the surface 5a without having to be accurately adjusted to a particular position relatively to axis X—X or re-adjusted as an object under inspection is moved. An ordinary electric filament lamp 9 can be used, e. g. a motor car headlamp bulb which can be supplied from a low-voltage source, or a standard type of small projection lamp. The light from one lamp does not tend to interfere with another and no masks are necessary between devices 6 to 6c. The tube 10 is slidably adjustable relatively to lamp 9 and can be clamped in position by screw and nut 14.

Each lamp case 7 has a spring clip 7a which carries the spring adjusting screw 15 and which can be slipped over the inner edge of the ring 5, the point of screw 15 being held by spring 7a against the rear of the ring plate and holding the case 7 with the points of three accurately pre-set levelling screws 16 thereon bearing against the surface 5a so that the cut-off is in the desired plane relatively to the lens element 3. The spring clips 7a apply sufficient frictional grip to hold the cases 7 firmly in place when they have been adjusted by being moved about over the surface 5a.

The lamp cases, instead of being held by spring clips or screw clamps or a combination of these could have a flat back of magnetic material accurately positioned relatively to the edge 11a of the mask 11, and be held on a modification of ring plate 5 formed as a magnetic chuck or faceplate. Again, if the ring plate 5 be of magnetic material the flat back of each case 7 could be formed by the poles of a permanent or electro-magnet.

Slides 1a are formed on the table 1. To adjust the distance between the boundary plane of the illuminating system and the lens element 3 the lens holder 2 and the bracket 4 can be moved relatively along the slides 1a and then locked in place.

In front of the ring plate 5 on the table 1 a work holder 17, shown in detail in Figs. 5 and 6 is adjustably mounted as set forth below. Fig. 5 shows the holder in elevation as seen from the front of the whole apparatus while Fig. 6 is a section along the axis X—X or one parallel thereto through the centre of the holder. This holder 17 is a bracket on which a lower jaw 18 is detachably fixed and an upper jaw 19 is hinged by the hinge pins 20, carried in lugs on the holder. Jaw 19 is held in the clamping position by the engagement therewith of the head of headed plunger 21 slidable through the holder 17 under the force of spring 23; for unclamping, the plunger can be lifted by the button 22 attached to the plunger. A turbine blade 38 is shown clamped by its fir-tree root in Fig. 6; the blade can be unclamped by pushing on button 22.

The work holder has a stem 17a by which it is detachably pivoted on part 24a of a carrier 24 which, by means of the usual lead screw rotated by handle 25, can be raised and lowered on vertical slides on the bracket 26 which in turn can rotate about a vertical axis or pivot 27 on the cross saddle 28. The latter can be traversed on cross slides 29a of the main saddle 29 by handle 30, the main saddle being movable along the slides 1a by the handle 31. For tilting the work holder 17 the part 24a can be turned about a horizontal axis on carrier 24 by the tilt knob 32 which co-operates with scale 33 to show the angle of tilt. Thus the work holder is mounted on a series of slides which, by separate lead screws and handles, allow adjustment towards and away from the lens element 3, transversely at right angles to the optical axis X—X of the lens and up and down. Since the holder 17 is mounted by vertical and horizontal pivots at right angles, an object held in the holder 17 and pointing towards the lens element 3 can be tilted up and down, turned through an adequate angle about a vertical axis, and turned about the lengthwise axis of the object. A transparent screen 36 is mounted above the work holder. The space below can be screened from unwanted extraneous light by curtains 37. A reflector 35 mounted on bracket 34 on the table behind the lens reflects on to the screen 36 the image received from the lens element 3. For inspection of turbine blades or objects of that size the system should produce on the screen an image magnified not less than ten times, further local magnification being obtainable is desired by use of a magnifying glass in front of the screen.

For carrying out an inspection of a turbine blade 38, it is held by its root in the work-holder 17 with its tip pointing towards the lens 3 and the work holder adjusted by handles 30 and 25 and knob 32 until the blade is lying more or less along the optical axis X—X of the lens. Four lamps in their cases 7 are slid over the plate 5 at about equal distances from the axis X—X and substantially equally spaced there around. By advancing the work holder by handle 31 the blade is fed towards the lens element 3 until the blade tip passes through the boundary plane of cut-off of the light; the part of the blade nearest to the lens is shown as illuminated with the rest in shadow and a silhouette of the outline of the blade on this plane appears in light against a dark background on screen 36. The blade is progressively fed towards the lens element 3 to inspect its profile along its length.

The profiles projected on to the screen 36 can be compared with correct profiles accurately drawn on glass or on translucent paper, film, or other material stretched over the screen; the drawngs may be on a roller blind which can be drawn over the screen. The density of the shadow around the blade outline should not be so great as to hide the line of the drawing if the blade be under size. If the masks 11 be turned through 180° in the tubes 10 the lamps will then illuminate only a part of the blade to the side of the boundry plane remote from the lens 3; the profile would then appear on the screen in shadow against a light background and again the shadow should not be so dense as to hide the line of the drawing should the blade be over size. It has been so far assumed that the masks 11 are opaque; but instead they could be for example coloured transparencies so that part of the blade, instead of being in shadow, would be illuminated in a colour different from the rest. This has not so far proved greatly advantageous in practice. Best results have been obtained by an arrangement for producing a dark shadow against a light background, in conjunction with auxiliary means for illuminating the whole screen 36 to relieve the density of the shadow just enough to show up the lines of the drawings, a preferred method being the use of a low power lamp illuminating the screen 36 from behind giving a diffused coloured light controllable by a switch conveniently mounted.

If the object has a surface not reflecting enough light or diffusing light sufficiently it may be covered with a white coating either not thick enough to alter the profile materially or of accurately known thickness.

The simplicity of the whole combination of devices makes it possible, if desired, to provide an arrangement with the lenses and illuminating assemblies duplicated side by side with double work holders to carry two blades or other objects in correct relation to each other; this allows two images—one of the work profile and the other of the corresponding profile of a standard pattern to be thrown on to a double size screen (ruled in squares) adjacent to each other for comparison, or for one image to be superimposed on the other.

It will be clear that one essential feature of the invention is that it produces on the screen a silhouette and not a mere line showing the outline of the blade; thus the outline of the blade is sharply indicated by the boundary between two differently illuminated zones. A further essential feature of the invention distinguishes it from the usual "shadowgraph" projector wherein the object lies between the lens and the source of light and is illuminated from the rear so that only the maximum profile can appear on the screen; illumination from the sides of the object by means disposed around the object in the present invention allows the profile at a chosen cross-section to be projected.

If the object being inspected be a long tapered object that extends at each end beyond the beams of light from the illuminating devices there will be a wide band of light on the object. Thus with the illustrated disposition of the mask 11 a small shadow may appear in the centre of the light silhouette of the section, which will not disturb the user since the section still appears in silhouette and not as a line.

If drawings be used for comparison they will usually be of cross-sections on planes normal to the axis of the blade or other object. When a thick object is viewed by tilting by means of knob 32 or the angle of tilt is considerable, special master profile drawings may be used, when inspecting the projected profile, so drawn as to compensate for the distortion of the profile when tilted to a predetermined angle. Alternatively in a double arrangement the work and a master pattern can be both tilted together to the same angle and compared. The method of the invention in some cases allows inspection of objects with enlarged ends forming masks, e. g. blades with shrouds at each end; by tilting the object, the top and then the bottom of one end of the blade can be viewed from about the middle to the end remote from the lens, after which the other end can be viewed by reversing the blade in the holder.

Such a method is particularly useful when examining leading and outlet or trailing edges of turbine blades, since by tilting the blade sufficiently it may be arranged for one end to move up to and past the projection lens which may therefore be of short focal length, thus allowing the whole length of the apparatus to be reduced and improving the intensity of illuminations of the screen without reducing the magnification. This is the principle of the form of constructon shown in Figs. 7 to 10, wherein moreover a wide band of light is directed on to only a portion of the periphery of the object, such as only the region of one edge of a turbine blade.

In the general outline of the apparatus shown in Fig. 7 the front hood 39 (with curtains 37) and the removable rear cover 40 are on the table 41. A holder 42 standing up from the table carries the inclined lens element 43 which is of short focal length. In front of the lens element, supported by feet 44 on the table 41, is the inclined flat metal ring plate 45 on the rear plane surface 45a of which are slidably mounted illuminating devices indicated by 46. The work holder unit 57 consists of a work clamp as in Figs. 5 and 6 mounted for sliding on the table 41 towards and away from lens element 43 and for tilting (relatively to the inclined optical axis of the lens) about an axis transverse to the table, as already described with reference to Fig. 1 but the movements of the workholder up and down and across the table are not essential. The reflector 55 mounted on bracket 54 on the table 41 behind the lens reflects the image received from the lens on to the screen 56 in front of the work holder, which screen can be viewed by looking into the open front of the hood 39.

The illuminating and optical systems, without the front screen 56 and the work holder, are shown in more detail in Fig. 8 in which for clearness the lens holder 42 has been slid back from the ring plate 45. Fig. 9 is a view of the illuminating system (without the feet 44) looking in the direction of arrow IX of Figs. 7 and 8, while Fig. 10 is an enlarged detail of the masking arrangement.

The ring plate 45 has an arcuate slot 45b along which can be adjusted the screwed stud portions 48a of the clamps 48. These clamps 48 can slide around the ring plate 45 and have flat backs bearing on the face 45a; they can be clamped in position by the nuts 49 on the stud portions 48a. The illuminating device 46 consists of the case 47, similar to the case 7 without the clips 7a, the tubular optical unit 50, and contents (lamp and lenses) similar to those in case 7 and tube 10 of Fig. 3. The mask 51 however now consists, as shown in Fig. 10, of the cap on the end of the tube unit 50 and has a wide slot 51a which causes a wide band of light to be thrown upon the turbine blade under inspection. As only the region of one edge of the blade has to be illuminated, only two illuminating devices 46, and 46a are shewn in Fig. 9; in some cases a single one will suffice, or if desired a third can be added since the units can readily be removed by undoing nuts 49. With the lens holder 42 in position the blade is close to the lens. For clearness a blade 38 is shewn, without the holder, adjacent to the illuminating system and the band of light is indicated thereon. By traversing the holder as already described with reference to Fig. 1 the blade can be moved progressively through the ring plate 45 towards the lens element 43 and until, if necessary, the blade tip has passed under the bottom of the lens. The image on the screen 56 will be a light silhouette of one edge of the blade against a darker background or vice versa.

In the former assembly the boundary plane of illumination is determined by the edge of mask slot 51a nearest to surface 45a and the profile checked is the outermost edge of the light silhouette. If the angle of the blade to the optical axis be sufficient for the image to be considerably different from the shape of the edge on a plane normal to the blade axis the image is compared with a drawing on the screen of the edge as it should appear on the inclined plane.

What I claim is:

1. In an inspection device for inspecting the profile of at least part of a chosen cross-sectional plane through an elongated object under inspection by illuminating the object around said profile and viewing the object from one end thereof, illuminating means consisting of a member having a face transverse to the direction of view, and a plurality of illuminating devices, each slidably adjustably mounted on said face for movement parallel to said plane, each said illuminating device including a lamp, a lamp holder, a lens system positioned to direct a beam of light from said lamp on to the object under inspection and a sharply delineated mask positioned in said beam, each said illuminating device also having a contact surface bearing against said face, the said contact surfaces in all the illuminating devices being accurately preset at the same distance from the cut-off edges of the sharply delineated masks.

2. An optical inspection device for projecting a silhouette having the profile of at least part of a chosen cross section of an elongated object under inspection including a lens system, a holder for carrying the object in a position lying along the general direction of the optical axis of the said lens system, illuminating means disposed around the object for illuminating the object along a substantial part of its length up to a determined boundary plane differently from another substantial part of the length beyond said plane with a sharp cut-off in that plane between the two different kinds of illumination, the said boundary plane being substantially perpendicular to said optical axis, said illuminating means comprising a member having a face transverse to the optical axis and a plurality of illuminating devices each slidably adjustably mounted on said face for movement parallel to said boundary plane, each said illuminating device including a lamp, a lamp holder, a lens system positioned to direct a beam of light from said lamp onto the object under inspection, and a sharply delineated mask positioned in said beam to vary the nature of the illumination over part of the object with a sharp cut-off from one kind of illumination to the other in the said boundary plane, and a viewing screen positioned to receive, through said first-mentioned lens system, a projection of a view looking along the object from the end which is pointing to the lens, means for moving said holder to carry the object through said plane until the desired cross section lies in that plane, and means for pivoting said holder to tilt the axis of the object at an angle to the said optical axis.

3. An inspection device according to claim 2 wherein said member is a ring plate with said face flat and parallel to said boundary plane and each said illuminating device bears against said face with a contact surface correctly pre-set in relation to the cut-off edge of said sharply delineated mask.

4. An optical inspection device for projecting a silhouette having the profile of at least part of a chosen cross section of an elongated object under inspection including a lens system, a holder for carrying the object in a position lying along the general direction of the optical axis of the said lens system, illuminating means disposed around the object for illuminating the object along a substantial part of its length up to a determined boundary plane differently from another substantial part of the length beyond said plane with a sharp cut-off in that plane between the two different kinds of illumination, the said boundary plane being substantially perpendicular to said optical axis, said illuminating means comprising a member having a face transverse to the optical axis and a plurality of illuminating devices each slidably adjustably mounted on said face for movement parallel to said boundary plane, each said illuminating device including a lamp, a lamp holder, a lens system positioned to direct a beam of light from said lamp onto the object under inspection, and a sharply delineated mask positioned in said beam to vary the nature of the illumination over part of the object with a sharp cut-off from one kind of illumination to the other in the said boundary plane, and a viewing screen positioned to receive, through said first-mentioned lens system, a projection of a view looking along the object from the end which is pointing to the lens, means for relatively moving the holder with respect to the illuminating means to effect relative movement of the object through said plane until the desired cross section lies in that plane, and means for pivoting said holder to tilt the axis of the object at an angle to the said optical axis.

References Cited in the file of this patent

UNITED STATES PATENTS

| | | |
|---|---|---|
| 2,256,102 | Reason | Sept. 16, 1941 |
| 2,357,542 | Pfeil | Sept. 5, 1944 |
| 2,574,119 | Mottu | Nov. 6, 1951 |
| 2,607,267 | Fultz | Aug. 19, 1952 |
| 2,629,936 | Cronstedt | Mar. 3, 1953 |